Figure 1:
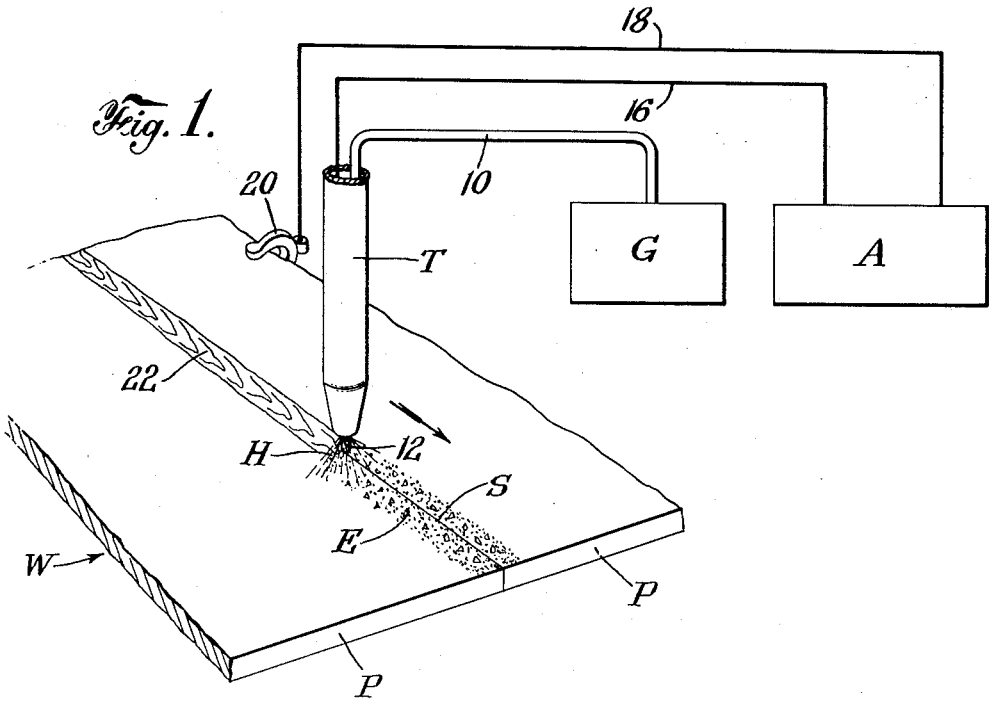

June 21, 1949. R. R. LOBOSCO 2,473,600
COATING WORK WITH AN ELECTRON-EMISSIVE MATERIAL TO
IMPROVE INERT GAS-SHIELDED REFRACTORY-ELECTRODE
ALTERNATING CURRENT ARC WELDING
Filed July 26, 1945

INVENTOR
ROSCOE R. LOBOSCO
BY
ATTORNEY

Patented June 21, 1949

2,473,600

UNITED STATES PATENT OFFICE 2,473,600

COATING WORK WITH AN ELECTRON-EMISSIVE MATERIAL TO IMPROVE INERT GAS-SHIELDED REFRACTORY-ELECTRODE ALTERNATING CURRENT ARC WELDING

Roscoe R. Lobosco, Elizabeth, N. J., assignor to The Linde Air Products Company, a corporation of Ohio Application July 26, 1945, Serial No. 607,219

5 Claims. (Cl. 219—10)

This invention relates to electric arc welding, and more particularly to alternating current arc welding with a relatively non-comsumable electrode in a protective atmosphere of inert monatomic gas.

In this type of welding, as pointed out by F. A. Wassell in his article entitled Characteristics of welding arcs on aluminum in atmospheres of helium and argon, published in The Welding Journal Research Supplement of Oct. 1944, a serious difficulty arises by virtue of complete or partial rectification of the alternating current. Such rectification causes very unsatisfactory and unacceptable welds to be obtained with some metals, particularly aluminum.

Rectification also causes certain difficulties with the welding apparatus. For example, when a conventional welding transformer is used, the rectification causes saturation of the transformer core. This saturation reduces the maximum power which the transformer can deliver, thus making it necessary to use a larger transformer. The saturation of the core also leads to higher line currents and a poor power factor, thus increasing the operating costs of the welding operation.

In the past, attempted solutions have failed to solve all of the difficulties caused by rectification. One method involved the superimposition of a high-frequency high-voltage alternating current on the conventional welding current, as disclosed in the application of W. B. Miller, Serial No. 569,588 filed December 23, 1944 for Welding. While this improves the welding operation, it does not entirely eliminate rectification difficulties, especially in the welding of aluminum.

Another prior method involved the use of a welding transformer having a high open-circuit voltage. The use of a high open-circuit voltage, however, makes certain precautions necessary for the safety of the operator. Furthermore, the use of this higher voltage results in a poorer power factor which will result in higher operating costs unless corrected by some means. Also the cost of the higher voltage welding transformer is considerably higher than the cost of conventional welding transformers. It follows that there is a great need for a suitable solution to the problem of rectification, which involves the use of conventional apparatus, operable at safe open-circuit voltage.

Therefore, the main object of this invention is to provide a safe, simple and inexpensive method of and means for eliminating rectification in gas-shielded, alternating current arc-welding in which a substantially non-consumable electrode is used.

According to the invention, this object is accomplished, for example, by providing a thin coating of electron emissive material, such as an oxide or carbonate of one or more of the alkaline earth metals, including barium, strontium and calcium or a compound or mixture containing emissive materials, on the work, at least in the area to be welded. The effect of such coating is to overcome rectification difficulties. Excellent results have been obtained in the alternating current welding of aluminum coated with such highly emissive material, both with and without the use of filler metal, in a protective gas of helium or argon. Difficulties due to saturation of the transformer core and high primary current are also substantially eliminated by practice of the invention.

Figure 2:
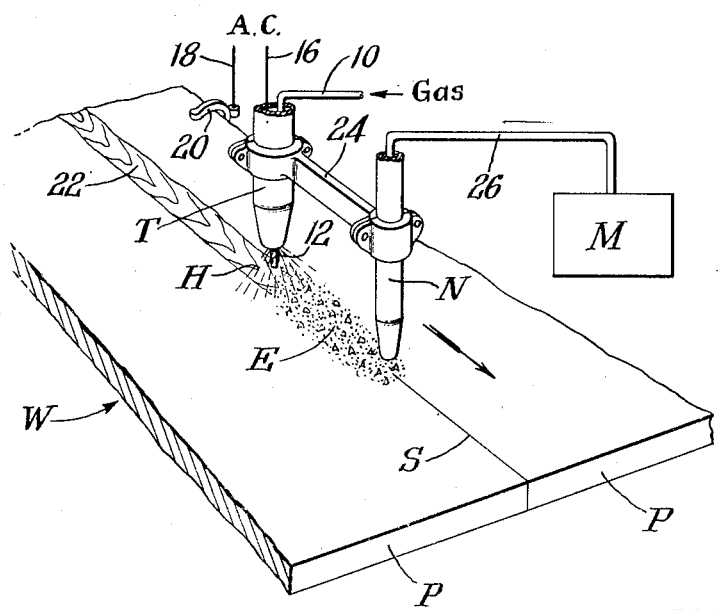

In the drawing:

Fig. 1 is a view mainly in perspective illustrating one example of the invention; and Fig. 2 is a perspective view of a modification.

This invention is primarily concerned with that type of welding which has: (1) A gas protected or blanketed weld using an inert monatomic atmospheric gas such as argon, helium, or a mixture of such gases; (2) A relatively non-consuming electrode composed of some suitable material such as tungsten, molybdenum, tantalum, carbon, etc.; and (3) An A. C. welding current either with or without a superimposed high-frequency, high voltage.

As pointed out above, one of the difficulties encountered with such welding is that partial or complete rectification of the welding current takes place. It is usually the reverse polarity component, i. e. the electrode positive half of the cycle which is partly or completely chopped off. This rectification has some undesirable effects: (1) When rectification takes place, unsatisfactory welds may be obtained particularly in the case of aluminum welding; (2) Rectification causes saturation of the standard welding transformer making it necessary to derate the transformer; (3) Since the degree of rectification varies, it is difficult to obtain steady welding conditions; (4) The arc has a tendency to be unstable.

It is generally believed that the rectification which occurs when welding aluminum is due to the oxide coating on the work. However, it has been found that some degree of rectification occurs with practically all metals. It is, therefore, likely that other factors besides surface oxides may be contributing to the rectification. Two factors which may have some bearing are: (1) The electron emission from the work surface is not sufficient; (2) The combination of a relatively sharp electrode having high emissive power when heated, a relatively flat work surface having relatively poor emissive power, and an ionizable gas blanket, favors conduction in one direction more than in the other direction.

It has been found that if the work surface is coated with an emissive material, such as one or more of the compounds of barium, strontium, or calcium, or any suitable combination of emissive and non-emissive materials, little or no rectification takes place. The emissive material can be applied to the work in any suitable form. For example, the emissive material can be applied in the form of a solution or a suspension in alcohol, water or other suitable medium, in combination with a suitable medium, or it can be applied in crayon form or as a vapor. It can be painted or sprayed on the work by means of a suitable dispenser. It can be applied sometime before the welding operation (for example by painting it on the work), or it can be applied immediately before the welding operation (for example by a jet or spray mounted on the torch).

It has been found that in addition to eliminating rectification, the use of such an emissive coating produces other desirable results, for example: (1) A more stable and quieter arc is obtained; (2) The arc length is less critical; (3) The arc is easier to strike; (4) With such coating it is possible to weld without a high-frequency stabilizing current in many cases where such stabilizing current would otherwise be necessary; (5) A relatively smooth flat puddle is obtained; (6) Stable arcs can be maintained at very low welding currents.

In Fig. 1 of the drawing, there is shown work W, which may be two plates P, P of aluminum, being butt-welded according to the invention, along the seam S. Prior to the welding operation, the plates P are provided with a thin coating E of finely divided oxide or carbonate of alkaline earth metal in a suitable wetting medium at least on the surface areas adjacent the seam S. A torch T, which may be like that shown in the Meredith Patent No. 2,342,086, is supplied with an inert monatomic gas such as argon or helium from a source G through a flexible conduit or hose 10. The torch T includes an electrode 12 composed of refractory material. The electrode 12 is connected in circuit relation with an alternating current source of supply A which may, if desired, include a high-frequency stabilizer voltage source, as disclosed in the above referred to application of W. B. Miller. The electric circuit includes conductors 16 and 18, the conductor 16 leading to the electrode 12, and the conductor 18 leading to a suitable ground clamp 20 which is secured in electrical contact with the work W. The conductors 16 and 18 are suitably insulated, and the conductor 16, at least, is flexible.

In the operation of the apparatus illustrated in Fig. 1 an arc is established between the electrode 12 and the work W at one end of the seam S, which work and electrode are protected from the atmosphere by the stream H of inert monatomic gas which surrounds the electrode at the adjacent zone of the work which is fused by such arc. The torch T is then moved along the path of the seam S in substantially constant spaced relation to the work, fusing and welding the plates P together at 22 as the operation proceeds. The coating of electron emissive material E overcomes prior difficulties due to rectification, and results in a very satisfactory weld, even with aluminum, without any increase in the "open-circuit" potential of the welding current.

In practicing the invention, it has been found that when the emissive material in a liquid medium is painted or brushed on the top surface of the work to be welded along the seam, as shown in Fig. 1, sufficient emissive material finds its way into the seam between the plates, for the production of an entirely satisfactory weld.

If desired, as shown in Fig. 2, a nozzle N for applying the emissive material to the work may be provided, which is connected to the torch T for movement therewith by any suitable means, such as a bracket 24. The bracket supports the nozzle N so that it is advanced in front of the torch. The nozzle N is connected by a flexible conduit 26 to a suitable source M of electron emissive material, so that the latter is discharged from the nozzle N and progressively coats the work W at E along the path to be welded prior to the actual welding operation which takes place under the torch T.

It has been found that, with liquid suspensions, the finer the particles are ground, the better are the emissive properties so that with the finer grinding less emissive material is required. Water or alcohol solutions can be used. Alcohol solutions seem to offer some advantages since the alcohol will evaporate more rapidly than water. Wetting agents and additives which will help to maintain the material in suspension may be desirable.

Barium and calcium salts, oxides and compounds are readily available. However, it is known that other compounds of the alkaline earth group also possess excellent emissive powers. A combination of two or more of these provide suitable material for the purpose of this invention.

Most of the work which has been carried on thus far has been with suspensions of the emissive material in water or alcohol which were painted on the work surface to be welded. Spraying the coating on the work is desirable particularly in the case of machine welding where the spray nozzle is mounted on the torch so as to spray the path ahead of the arc, as shown in Fig. 3. It has been found that the vapors given off by the coating, when the arc is passed thereover will deposit on a work-piece located some distance from the work table. Such deposit is sometimes heavy enough to reduce or eliminate rectification difficulties. Thus, a satisfactory coating can be applied to the work in the form of a vapor of the emissive material. It has also been found that the emissive coating can be accidently applied by means of hands, gloves, work tables, etc. which have been exposed to the emissive material.

The easiest method of using the coating is to apply it on the work surface along the weld path, but other methods have desirable features under certain circumstances. If the coating is applied to the two butting faces of the workpiece, it will tend to concentrate the arc along the seam. This is particularly desirable in welding relatively thick workpieces. Coating a filler strip or rod is desirable for certain types of work involving the use of filler metal.

At the present time the art is primarily concerned with producing a good weld in aluminum and the provision of an emissive coating on the aluminum, according to the invention, enables this to be done. However, one should not lose sight of the fact that such coating also offers other very important advantages, for example: Oscillographic studies have shown that the rectification has been greatly reduced or eliminated with all of the metals tried thus far, including aluminum, magnesium, copper, red and yellow brass, stainless steel, mild steel, and cast iron. By reducing rectification, saturation of the welding transformer is avoided, thus making it possible to use the transformer at a higher rating. Furthermore, welding costs are reduced because of the lower line current and better power factor and the welding speed is increased. The electron emissive coating also produces better welds in other metals, as well as aluminum. Another important advantage is that it is very easy to strike and hold the arc when an emissive material is used according to the invention.

An example of the effectiveness of emissivity materials in "Heliarc" welding with alternating current is the hand welding of aluminum, particularly the making of fillet welds where filler rod is added to form the deposited metal. When no emissive materials are used, and the arc is extinguished, either by fouling the tungsten electrode with the fused puddle or by shorting with the filler rod, it is very difficult to restart and pick up the weld due to oxidation of the fused metal. This oxide results in rectification of the alternating current arc with loss of heat. The weld can be restarted only on clean surfaces free from oxidation. If very small amounts of an emission agent, such as barium carbonate, are added to the seam to be welded before welding this material prevents rectification and allows the fusion to be restarted on the oxidized area with the result that a uniformly welded seam is attained.

What is claimed is:

1. A method of welding metal without flux which comprises coating the work to be welded with an electron emissive material composed of an alkaline earth metal, positioning a substantially non-consumable electrode adjacent such work, surrounding the electrode and the space between said electrode and the work and the zone to be welded with an inert monatomic gas, striking an alternating current welding arc between said electrode and the work, and advancing said electrode along the zone to be welded so as to cause such arc to fuse the work in the welding zone under such gas.

2. In the art of fluxless welding aluminum, the improvement which comprises coating the aluminum with a very finely-divided material composed of electron emissive material composed of a compound of alkaline earth metal suspended in a volatile liquid containing alcohol which evaporates rapidly when applied to the aluminum and then welding such coated aluminum by the action of an electric arc between the aluminum and a tungsten electrode in an atmosphere of inert monatomic gas.

3. A process of fusing without flux readily oxidizable metals of the group consisting of aluminum, magnesium, and stainless steel along a desired path progressively from one end to the other thereof, which comprises coating such path on the base metal to be fused with a thin surface layer of electron emissive material composed of a compound of an alkaline earth metal, positioning a refractory electrode adjacent one end of the path in spaced relation to the metal, enveloping such electrode and the space between the electrode and metal in a stream of inert monatomic gas, establishing an alternating current arc between the metal and said electrode, causing the metal to fuse under the gas in the zone adjacent the electrode, and progressively moving said electrode and enveloping gas stream along the path with the electrode in spaced relation to the metal, such surface layer acting to improve the fusing process and inhibiting rectification of the alternating current due to the presence of oxide of the base metal.

4. In fluxless inert gas shielded refractory electrode alternating current arc welding of parts composed of alternating current rectifying surfaced metal of the group consisting of aluminum, magnesium, copper, and stainless steel, the surface nature of which causes welding current rectification difficulties in this type of welding, the improved process which comprises juxtaposing the metal parts to be welded to provide work with a welding seam, coating the metal parts to be welded adjacent the welding seam with a thin layer of material composed of a compound of the group consisting of barium, strontium, and calcium, which emits electrons copiously when heated, positioning a bare tungsten electrode at the starting point of the weld adjacent such seam, discharging a stream of inert gas containing gas of the group consisting of argon and helium toward the work from a nozzle surrounding said electrode, applying an alternating current welding potential between said electrode and the work, starting a metal fusing alternating current welding arc between said electrode and the work at such point on the welding seam, thereby causing the coating material to copiously emit electrons, and advancing the electrode along the seam while continuing the alternating current welding arc and the discharge of such inert gas stream which shields the arc and fused metal from the atmosphere as the parts are progressively fused together by the arc, said coating of electron emissive material on the work effectively overcoming rectification difficulties with the result that the welding arc starts and is maintained easily and the resulting weld is sound and clean throughout.

5. A process of welding as defined by claim 4, in which the metal to be welded is coated with electron emissive material prior to the welding operation, by exposure to the vapor of an alkaline earth metal.

ROSCOE R. LOBOSCO.

REFERENCES CITED

The following references are of record in the file of this patent:

UNITED STATES PATENTS

| Number | Name | Date |
|---|---|---|
| 521,600 | Buecher et al. | June 19, 1894 |
| 1,281,796 | Ladoff | Oct. 15, 1918 |
| 1,294,250 | Elliott | Feb. 11, 1919 |
| 1,783,013 | Green | Nov. 25, 1930 |
| 1,812,103 | MacRae | June 30, 1931 |
| 1,870,003 | Elsey | Aug. 2, 1932 |
| 1,870,951 | Fredenburgh | Apr. 9, 1932 |
| 1,939,075 | McCullouch | Dec. 12, 1933 |
| 1,974,608 | Giard | Sept. 25, 1934 |
| 1,977,278 | Judy | Oct. 16, 1934 |
| 2,053,408 | Pfanstiehl | Sept. 8, 1936 |
| 2,075,025 | Dietz | Mar. 30, 1937 |
| 2,182,087 | Leverenz | Dec. 5, 1939 |
| 2,258,675 | Cohn | Oct. 14, 1941 |
| 2,269,538 | Lewbers | Jan. 13, 1942 |
| 2,315,852 | Gordon | Apr. 6, 1943 |
| 2,342,086 | Meredith | Feb. 15, 1944 |
| 2,362,510 | Stutsman | Nov. 14, 1944 |